(12) United States Patent
Pikesh et al.

(10) Patent No.: US 7,004,987 B2
(45) Date of Patent: Feb. 28, 2006

(54) INTAKE AIR PRE-CLEANER WITH ASPIRATOR PORT CHAMBER FOR COLLECTING AND HOLDING PARTICLES FOR LATER ASPIRATION

(75) Inventors: Derryn W. Pikesh, Geneseo, IL (US); Randy Carlz, Bettendorf, IA (US)

(73) Assignee: Case Corporation, Racine, WI (US)

( * ) Notice: Subject to any disclaimer, the term of this patent is extended or adjusted under 35 U.S.C. 154(b) by 398 days.

(21) Appl. No.: 10/109,417

(22) Filed: Mar. 28, 2002

(65) Prior Publication Data

US 2003/0182910 A1 Oct. 2, 2003

(51) Int. Cl.
*B01D 45/12* (2006.01)

(52) U.S. Cl. .......................... 55/347; 55/348; 55/385.3; 55/396; 55/430; 55/457

(58) Field of Classification Search ................... 55/343, 55/347, 348, 385.3, 396, 423, 430, 431, 466, 55/457
See application file for complete search history.

(56) References Cited

U.S. PATENT DOCUMENTS

| | | | | |
|---|---|---|---|---|
| 3,469,566 A | * | 9/1969 | Wilkinson et al. ............. | 60/317 |
| 3,915,679 A | | 10/1975 | Roach et al. ................... | 55/347 |
| 4,127,396 A | | 11/1978 | Tortorici et al. ............... | 55/396 |
| 4,218,223 A | | 8/1980 | Lidstone et al. ................ | 55/1 |
| 4,388,091 A | | 6/1983 | Khosropour .................. | 55/337 |
| 4,394,145 A | | 7/1983 | Sundseth ...................... | 55/347 |
| 4,469,490 A | | 9/1984 | Wilson ............................ | 55/1 |
| 4,950,317 A | | 8/1990 | Dottermans .................. | 55/337 |
| 5,320,653 A | | 6/1994 | Morgan et al. ................ | 55/337 |
| 5,403,367 A | | 4/1995 | De Villiers et al. ........... | 55/320 |

\* cited by examiner

*Primary Examiner*—Robert A. Hopkins
(74) *Attorney, Agent, or Firm*—John William Stader; Collin A. Webb

(57) ABSTRACT

A pre-cleaner for an air induction system of an internal combustion engine including a housing enclosing an upper chamber and an aspirator port chamber, the upper chamber containing a plurality of particulate separator tubes for removing particles from air flowing through the tubes en route to the engine. The aspirator port chamber is located beneath and is upwardly open to the particulate outlets such that discharged particles can fall or flow from the tubes into the aspirator port chamber, the aspirator port chamber containing a large capacity upwardly facing particle collecting surface or trough for receiving the particles, and the housing including a generally horizontally facing aspirator port connecting to the aspirator port chamber adjacent to the particle collecting surface or trough, the aspirator port having a predetermined vertical extent and the particle collecting surface or trough having a horizontal extent in a direction substantially directly facing or aligned with the aspirator port sufficiently greater than the vertical extent of the aspirator port such that during periods when the particles are not aspirated into the aspirator port the particles can collect and settle on the particle collecting surface or trough for later aspiration when conditions improve.

11 Claims, 3 Drawing Sheets

INTAKE AIR PRE-CLEANER WITH ASPIRATOR PORT CHAMBER FOR COLLECTING AND HOLDING PARTICLES FOR LATER ASPIRATION

TECHNICAL FIELD

This invention relates generally to pre-cleaner devices for air entering the intake or induction tract of an internal combustion engine, and more particularly, to a pre-cleaner for separating dust and other particulates from a flow of air entering the intake tract and aspirating the separated particulates into the engine exhaust, the pre-cleaner having an improved aspirator port chamber which substantially reduces the possibility of blocking and clogging by the particulates of an aspirator port connected to the engine exhaust and other regions of the pre-cleaner during periods of poor aspiration.

BACKGROUND ART

Airborne particulates, such as fine dust, dirt, sand, crop material, and the like, must be separated from air entering an internal combustion engine such that the particulates do not travel on to clog passages within the engine and/or cause significant damage thereto. A well known manner of separating such particulates from the air flow is to cause the air to flow in a vortex or cyclone stream such that airborne particulates can be deflected or directed out of the air flow which travels onto the engine. Reference in this regard, Roach et al. U.S. Pat. No. 3,915,679, issued Oct. 28, 1975 to Pall Corporation; and Sundseth U.S. Pat. No. 4,394,145, issued Jul. 19, 1993, which disclose air cleaners or air pre-cleaners utilizing a plurality of tubular dust or particle separator elements arranged in an array in a housing and within which the particles of dust and the like are separated from air flowing therethrough enroute to an engine or other device. The Roach et al. patent is further noted as it discloses an outlet line connection from the air cleaner array to a blower operable for scavenging air flow from the array to carry away and remove the dirt separated from a main air flow to the engine, the outlet line connection being located beneath the array. A disadvantage of dust disposal arrangements such as that of the Roach et al. patent is the requirement of the blower, which adds expense and complexity, takes power from the engine, and any failure or inadequate operation of which can have severe operational consequences. The Sundseth patent, in contrast, discloses a simpler elastomeric dust valve member which collects the dust and discharges it when the weight thereof overcomes elastic sealing valve lips of the valve member. A shortcoming of this manner of disposal, however, is the evident limited dust disposal capacity and thus a resultant lack of utility for extremely dusty applications as can be encountered such as for use on agricultural harvesting machines such as combines and cotton pickers, which are known to be used in environments so dusty that visibility around the combine or picker is near zero.

Still other known pre-cleaner constructions utilize exhaust flow of the engine for aspirating or scavenging dust and other particulates from the pre-cleaner housing, such as disclosed in Lidstone et al. U.S. Pat. No. 4,218,223, issued Aug. 19, 1980 to Donaldson Company, Inc., which advantageously eliminates the need for a blower. However, a shortcoming possible with devices of this type is that the port connected to the exhaust for aspirating or scavenging the collected dust is located and oriented so as to be possibly less effective for removing dust from the device during and after periods of low exhaust flow conditions, such as when the engine is idling or operating under a low load, resulting in an accumulation of the dust or other particulates in the lower region of the device so as to require more frequent cleaning of the device, which can be time-consuming and costly.

Thus what is sought is an aspiration type pre-cleaner for the air intake or induction path of an internal combustion engine which provides an effective particulate separation capability without requiring the complexity of a blowers or the like, and which is less prone to particulate build-up and blockage brought on as a result of periods of idle, low engine load operation, and the like.

SUMMARY OF THE INVENTION

According to a preferred aspect of the present invention, a pre-cleaner for an air induction system of an internal combustion engine is disclosed which provides the sought after characteristics and properties discussed above. The present pre-cleaner includes a housing enclosing an upper chamber and an aspirator port chamber, the upper chamber containing a plurality of particulate separator tubes arranged in a predetermined array, each of the tubes including a particulate outlet through which particles removed from air flowing through the tube en route to the engine are discharged. The aspirator port chamber is located beneath and is upwardly open to the particulate outlets such that discharged particles can fall or flow from the tubes into the aspirator port chamber, the aspirator port chamber containing a large capacity upwardly facing particle collecting surface for receiving the particles, and the housing including a generally horizontally facing aspirator port connecting to the aspirator port chamber adjacent to and at least partially facing the particle collecting surface, and an element disposed for connecting the aspirator port to an exhaust tract of the internal combustion engine for generating a suction condition in the aspirator port when the engine is operated. The aspirator port has a predetermined vertical extent and the particle collecting surface has a horizontal extent in a direction facing substantially toward or aligned with the aspirator port sufficiently greater than the vertical extent of the aspirator port such that when the suction condition is inadequate for drawing or aspirating the particles from the collecting surface into the aspirator port the particles can collect and settle on the particle collecting surface so as to form an upwardly facing particle surface adjacent to the aspirator port which is oriented generally horizontally or at a small acute angle to horizontal in the direction toward the aspirator port such that sufficient flow is allowed through the aspirator port such that the collected particles can later be drawn into the aspirator port by a stronger suction condition when present.

As a result, even during periods of prolonged low suction operation, such as when the engine is idling for a long period of time under high airborne dust conditions, clogging of the pre-cleaner and particularly the aspirator port is avoided, the collected dust or other particulates being later readily aspirated into the exhaust when suction conditions become stronger, thereby extending the intervals between required cleanings of the pre-cleaner.

DETAILED DESCRIPTION OF THE INVENTION

Figure 1:
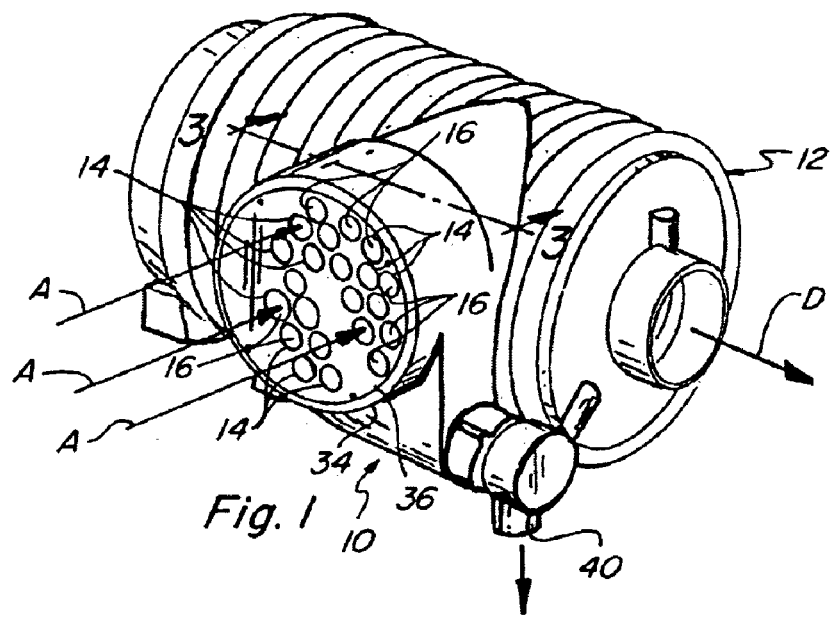
FIG. 1 is a perspective view of an air cleaner assembly for an internal combustion engine including a pre-cleaner and aspirator port chamber according to the present invention and showing arrows to illustrate air flow into the pre-cleaner and from the aspirator port and the air cleaner.
Figure 2:
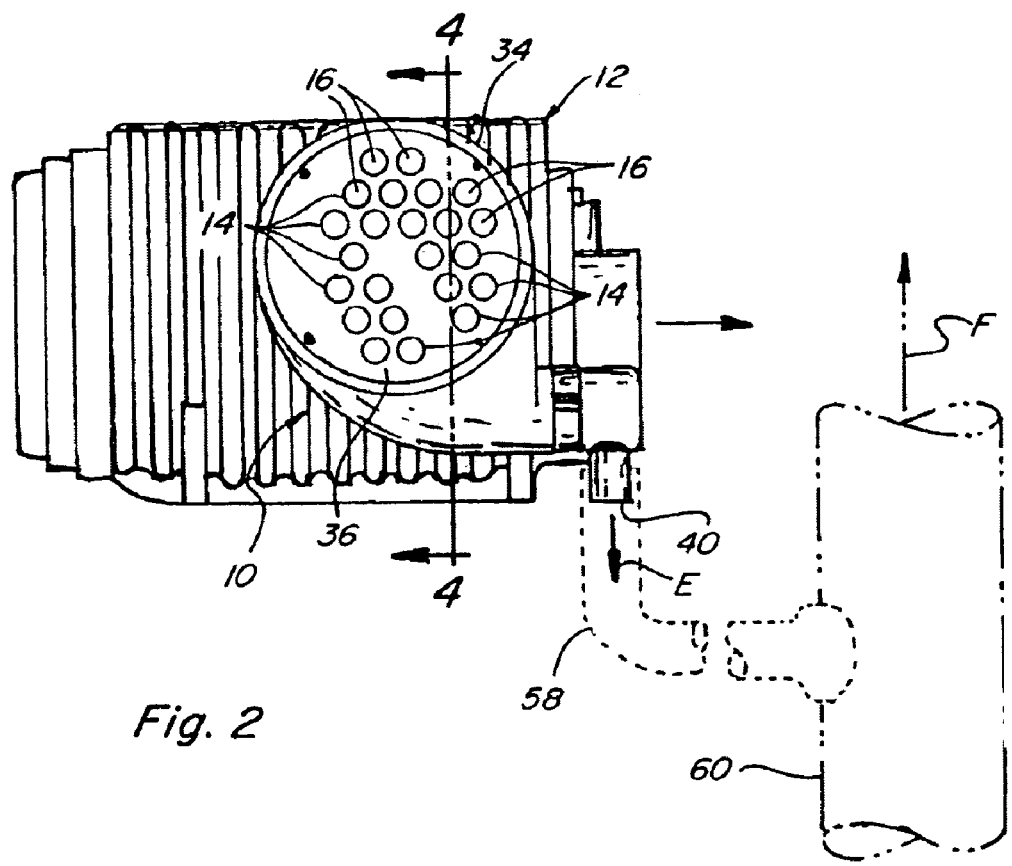
FIG. 2 is a side elevational view of the air cleaner assembly and pre-cleaner of FIG. 1 showing the aspirator port connected to an exhaust tract of an internal combustion engine shown in phantom.

Referring now to the drawings, in FIGS. 1 and 2, a pre-cleaner 10 is shown in association with a conventional air cleaner 12 for removing particulates such as fine dust, sand, and plant matter from air entering an intake or induction system of an internal combustion engine (not shown) of a machine such as an agricultural combine, a construction machine, or the like (also not shown). Pre-cleaner 10 includes a plurality of particulate separator tubes 14 arranged in a predetermined array and including respective air inlets 16 for receiving individual flows of air, represented by arrows A, from atmosphere.

Figure 4:
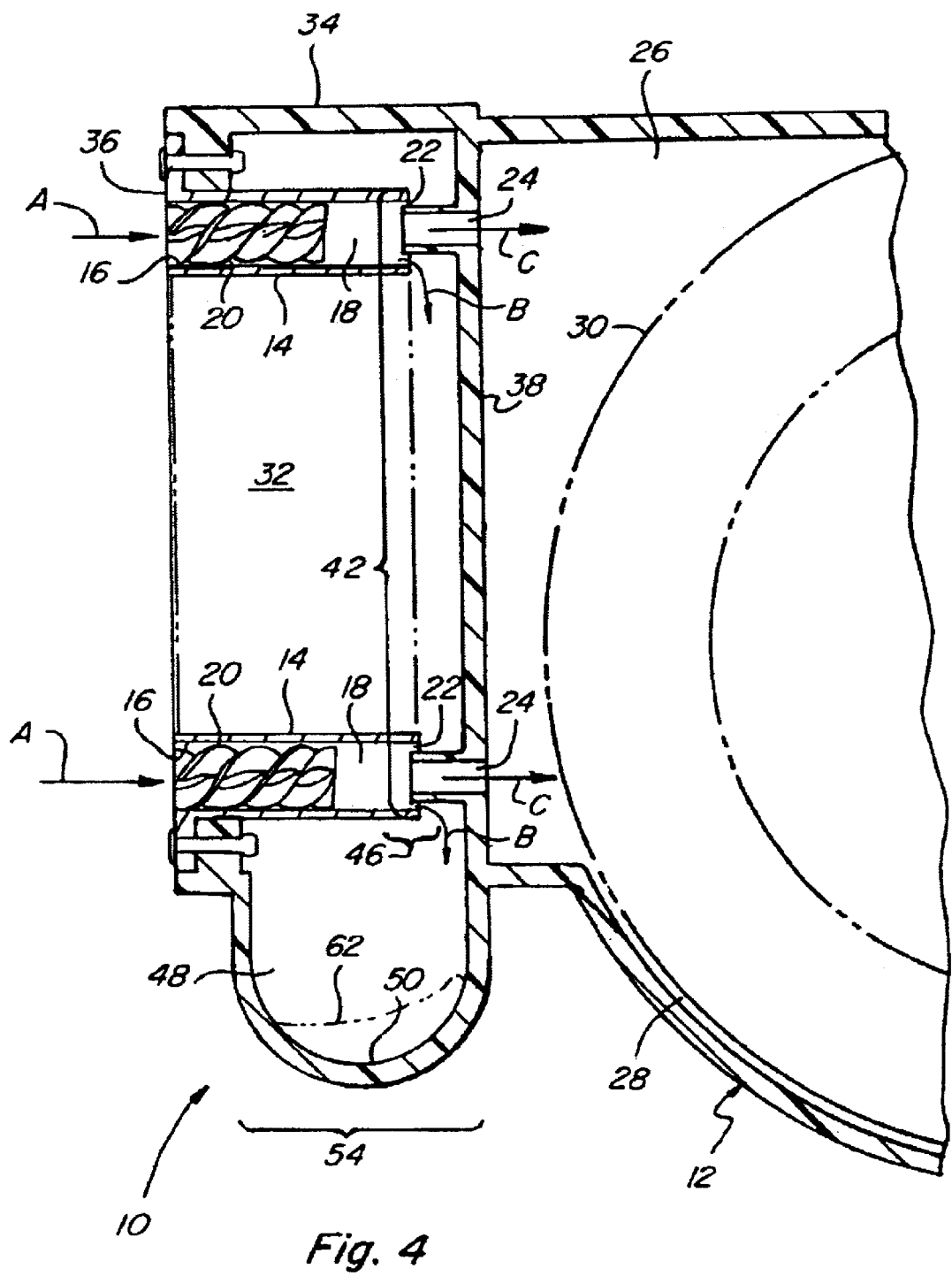
FIG. 4 is a sectional view taken along line 4—4 of FIG. 2, showing internal aspects of the air cleaner and the pre-cleaner, including arrows showing particulate flow through particulate separator tubes of the pre-cleaner, and showing the collected particles in phantom on the particulate collecting surface in the aspirator port chamber.

Referring to FIG. 4, each particulate separator tube 14 of pre-cleaner 10 is hollow so as to define an air flow passage 18 therethrough including vanes 20 for inducing air flow A into a spiral or vortex flow pattern such that particles such as fine dust and the like suspended in air flow A through passage 18 will be separated from the flow by centrifugal force and ejected or passed from tube 14 through a particulate outlet 22 of the tube 14, as denoted by arrows B, while clean or largely particulate free air, denoted by arrows C, can flow from tube 14 through a clean air outlet 24 thereof so as to pass through a connecting passage 26 into an internal cavity 28 of air cleaner 12. Air cleaner 12 is representative of a wide variety of filter devices including a cartridge or other type filter element, represented in phantom by a filter element 30, and operable for further removing particulates from the air flow en route to the internal combustion engine. The clean air flow, denoted by arrow D in FIG. 1, exits air cleaner 12 and enters an intake duct or induction passage (not shown) of the internal combustion engine and travels onto the combustion chamber or chambers thereof (also not shown) in the well known conventional manner.

Particulate separator tubes 14 are arranged in the predetermined array in an upper chamber 32 of a housing 34 of pre-cleaner 10, and supported by an inlet cover plate 36 and an outlet cover plate 38 of housing 34. Cover plates 32 and 34 enclose and seal opposite ends of chamber 32, particulate outlets 22 of tubes 14 and an aspirator port 40 for aspirating the separated particles from chamber 32 as discussed below, preferably being the only connections or openings between chamber 32 and a location outside housing 34. Substantially all of the particulate outlets 22 are desirably located within a predetermined area 42 having a predetermined length or longest horizontal extent 44 in a direction corresponding or parallel to a direction of flow into aspirator port 40, and a smaller horizontal extent 46 or width perpendicular to longest horizontal extent 44, as shown.

Pre-cleaner 10 includes an elongate aspirator port chamber 48 constructed and operable according to the teachings of the present invention for collecting and holding a quantity of the separated particles during periods of poor aspiration conditions for later aspiration into an exhaust tract of the engine. Chamber 48 is enclosed by housing 34 and is located beneath and upwardly open to upper chamber 32. Importantly, chamber 48 includes or contains an elongate, upwardly facing particle collecting surface 50 for receiving and holding the particles, surface 50 being directly adjacent to port 40 and having a longitudinal horizontal extent 52 in a direction facing directly toward or substantially aligned with port 40 so as to define the principal particle flow path into port 40, and so as to also be longitudinally aligned at least substantially with area 42. Surface 50 additionally has a horizontal extent 54 or width in a direction perpendicular to extent 52 which is preferably larger than extent 46 of area 42, extents 52 and 54 being large enough such that surface 50 has the capacity to receive and hold an anticipated quantity of particles discharged from tubes 14 during an anticipated period of poor aspiration, extent 52 also being sufficiently large such that desired particle aspiration and flow characteristics into port 40 are achieved. In this latter regard, for an aspirator port 40 having a representative vertical extent 56, it has been found that a particle collecting surface 50 having a preferred horizontal extent 52 in the direction facing and aligned with port 40 equal to at least about one and one half times vertical extent 56, and more preferably equal to at least about twice the vertical extent 56 as shown, will provide the desired particle holding capacity for anticipated periods when aspiration is poor, and also desired suction induced particle flow characteristics over surface 50 into port 40 when aspiration conditions later improve, such that the particles collected on surface 50 can be effectively aspirated into port 40. Essentially then, it should be understood that the lower portion of aspirator port chamber 48 directly adjacent to and defining the principal flow path into aspirator port 40 should be adequately large to serve as a trough or channel or holding area for receiving and holding a desired quantity of the particles when suction conditions are weak, and so as to provide a direct flow path extending into and aligned with port 40 for direct or straight suction induced flow of the collected particles and also new particles into port 40 when the suction conditions later improve.

Here, it should be understood that because pre-cleaner 10 is contemplated to be used on an internal combustion engine for operating a machine such as an agricultural combine, a construction machine, or the like, pre-cleaner 10 will typically be vibrating or shaking such that the particles located on surface 50 will move and eventually settle thereon to at least some extent. So as to more effectively position the collected particles on surface 50 for aspiration into port 40 after the particles have settled thereon, it is desired and preferred that that portion of surface 50 nearest port 40 be oriented horizontally or at only a small acute angle to horizontal in the direction extending into and aligned with port 40, such that the collected particles will not have a significant tendency or ability to migrate along surface 50 toward port 40 to such an extent or at such a rate so as to enter and potentially block or clog port 40 during periods of poor aspiration, and, so that later, when conditions improve, the collected particles cannot be adequately aspirated into port 40.

Figure 3:
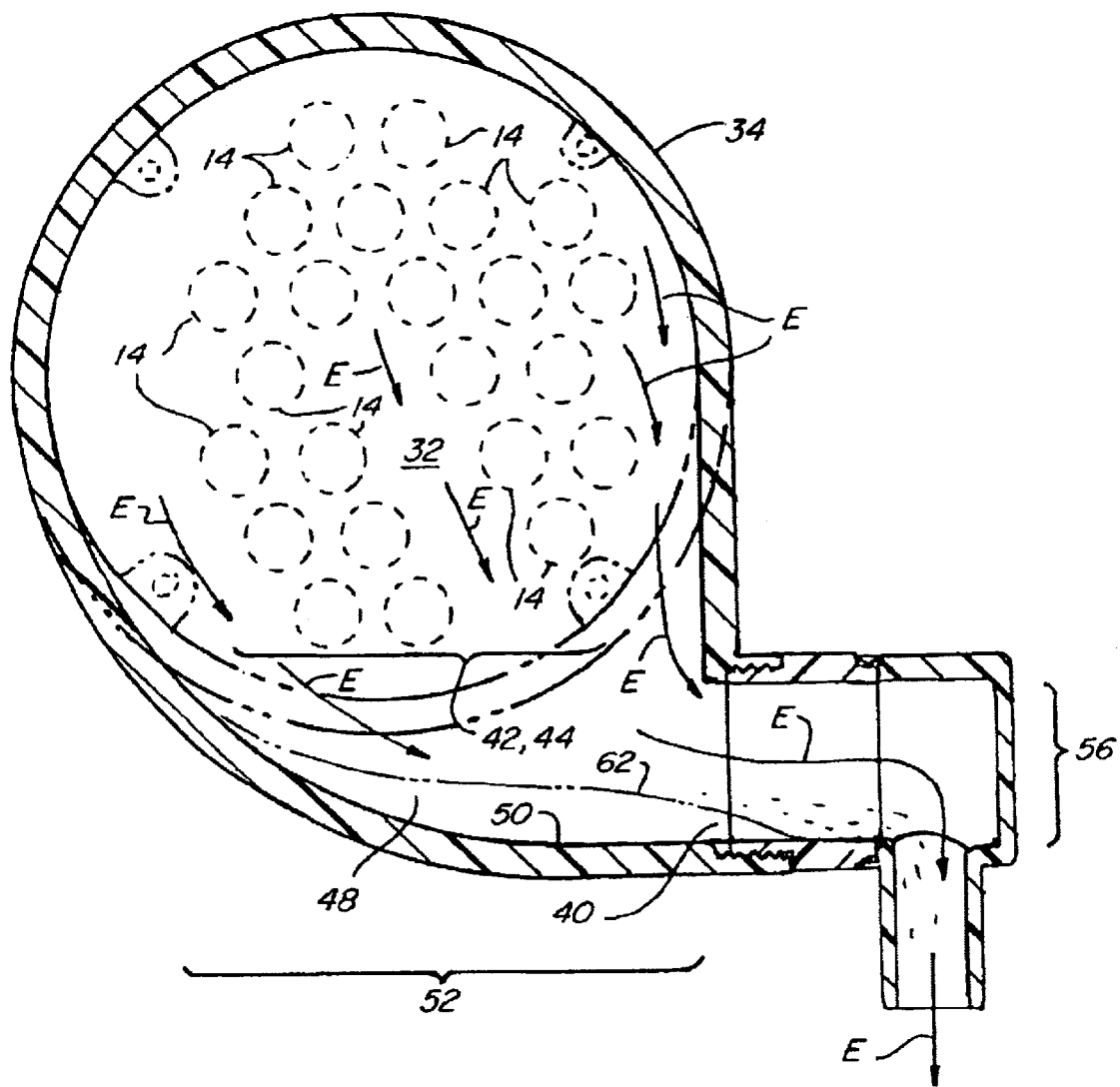
FIG. 3 is a sectional view taken along line 3—3 of FIG. 1, showing internal aspects of the pre-cleaner and aspirator port chamber including arrows representative of air and particulate flow therethrough en route to an exhaust port, and showing collected particles in phantom on a particulate collecting surface in the aspirator port.

Referring more particularly to FIGS. 2 and 3, it should also be understood that it is anticipated that the suction required for the flow and aspiration of particles from chambers 32 and 48 of pre-cleaner 10, denoted by arrows E, can be generated by the engine in any desired manner, for instance, but not limited to, by connection of aspirator port 40 in the conventional and well known manner by a conduit such as duct 58 to an exhaust tract 60 of the engine (not shown) to which the intake or induction air is being supplied through pre-cleaner 10 and air cleaner 12. In general, a flow of exhaust gas through tract 60, denoted by arrow F (FIG. 2), will generate a suction condition in duct 58 toward tract 60 which is communicated through duct 58 and port 40 into chambers 32 and 48, such that when strong enough, will result in the flows E sufficient for carrying particles toward port 40. The strength of the flows E will be dependent on or largely a function of the velocity of exhaust flow F, a higher velocity exhaust flow F resulting in better and stronger particle flows E, and conversely, a lower velocity exhaust flow F resulting in poorer and weaker flows E.

It should also be noted that it has been observed that the strength of the suction generated and resultant flows E will typically vary largely as a function of the operating condition or mode of the engine, particularly, whether the engine is operating under idle conditions or under load, the suction generally being lower or weaker when the engine is idling and greater or stronger when the engine is under load. It should also be recognized that the strength of the suction particularly in the upper region of upper chamber 32 will also be affected to some extent by the air flow capacity or size of particulate outlets 22, and any pressure differential condition between chamber 32 and air flow passages 18 of tubes 14.

During the periods when the suction is poorer or weaker, such as during idle conditions, many of the particles passing into chamber 32 through outlets 22 and not drawn or aspirated by the suction into aspirator port 40 will fall into aspirator port chamber 48 and collect and settle on surface 50 therein so as to form an upper particle surface 62 as generally denoted in phantom in FIGS. 3 and 4, which is, in substantial part, at least generally horizontal or oriented at only a small acute angle to horizontal, due to the settling of the particles. The horizontal extent 52 of surface 50 in the direction directly facing or aligned with and extending into port 40, as discussed previously, is preferably sufficient such that the particles can collect and settle on surface 50 in this manner during anticipated periods of weak aspirator suction, without upper surface 62 attaining a height or vertical extent sufficient to substantially effectively block or clog aspirator port 40, or for the particles to settle in lower portions of port 40 causing blockage, such that the particles cannot be later aspirated into or through port 40 by a stronger suction condition. In regard to this latter instance, it should be noted that it is preferable that port 40 be located beyond and not substantially beneath predetermined area 42 of upper chamber 32, such that particles will largely not be able to fall directly from tubes 14 into port 40 so as to potentially block or clog it.

Additionally, the preferred length of surface 50 in the direction facing or aligned with port 40, the shape of surface 50, and the location thereof enables it to direct or guide and align at least the flows E adjacent thereto and thereover for direct and straight passage into port 40, the flows E over surface 50 and over the upper particle surface 62 preferably being at least generally horizontal or at only a small acute angle to horizontal, so as to facilitate picking up of the particles by the flows E and direct passage of the particles into port 40 when the suction conditions are strong enough. In this regard, it should be noted that by the term small acute angle what is meant is an angle less than about 30 degrees and more preferably less than about 20 degrees.

It is also desirable and preferred that that portion of surface 50 farthest from port 40 have a curved or angled shape extending downwardly in the direction toward or aligned with port 40, and connect to an at least generally horizontal portion of surface 50 located between the curved portion and port 40, to facilitate smooth and direct flow of the particles into port 40. Lastly, it should be noted that port 40 and duct 58 will preferably be of smaller cross sectional extent than chambers 32 and 48, and thus the velocity of flow E therethrough will be greater, such that the shape and extent of port 40 and duct 58 are less critical to aspiration, bends and curves therein being more permissible, as required for a particular application.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A pre-clean for an air induction system of an internal combustion engine, comprising:

a housing enclosing an upper chamber and an aspirator port chamber;

the upper chamber containing a plurality of particulate separator tubes arranged in a predetermined array, each of the tubes including a particulate outlet through which particles removed from air flowing through the tube en route to the engine are discharged, the aspirator port chamber being located beneath and upwardly open to the particulate outlets and including an upwardly facing particle collecting surface located directly beneath the particulate outlets such that discharged particles can fall from the tubes into the aspirator port chamber and onto the upwardly facing particle collecting surface, the housing including a generally horizontally facing aspirator port in the aspirator port chamber adjacent to and facing the particle collecting surface, and an element disposed for connecting the aspirator port to an exhaust tract of the internal combustion engine such that the exhaust flow through the exhaust tract will generate a suction condition in the aspirator port when the engine is operated, wherein the aspirator port has a predetermined vertical extent and the particle collecting surface has a horizontal extent in a direction substantially aligned with the aspirator port sufficiently greater than the vertical extent of the aspirator port such that when the suction condition is inadequate for drawing particles from the collecting surface into the aspirator port the particles can collect and settle on the particle collecting surface so as to form an upwardly facing particle surface adjacent to the aspirator port which is oriented at an angle of from about zero to about thirty degrees to horizontal in the direction toward the aspirator port so as to allow sufficient flow through the aspirator port and such that the collected particles can later be drawn into the aspirator port by a stronger suction condition generated by the exhaust flow when present.

2. The pre-cleaner of claim 1 wherein the horizontal extent of the particle collecting surface in the direction substantially aligned with the aspirator port is equal to at least about one and one-half times the vertical extent of the aspirator port.

3. The pre-cleaner of claim 2 wherein the particle collecting surface has an upwardly facing concave shape then viewed through the aspirator port.

4. The pre cleaner of claim 1 wherein the particle collecting surface is positioned and oriented such that the suction generated by the exhaust flow during the operation of the engine will draw a flow of air from the upper chamber across the upwardly facing particle surface such that the particles thereof will be drawn in an at least generally horizontal direction into the aspirator port.

5. The pre-cleaner of claim 1 wherein the particulate collecting surface includes a curved surface portion spaced from and in opposing relation to the aspirator port, the curved surface portion curving downwardly in the direction aligned with the aspirator port, and a surface portion extending at least generally horizontally from the curved surface portion to the aspirator port.

6. A pre-cleaner for aspirating particles from a flow of air to an intake of an internal combustion engine, comprising:

a housing enclosing an upper chamber and an aspirator port chamber;

the upper chamber containing a plurality of particulate separator tubes arranged in an array, each of the tubes including an air inlet in communication with atmosphere for receiving a portion of the flow of air containing the particles, at least one element within the tube for separating the particles from the air, a clean air outlet for passage of the air from the tube en route to the intake, and a particulate outlet for passage of the separated particles from the tube into the upper chamber, at least a substantial portion of the particulate outlets being located within a predetermined area in the upper chamber having a predetermined horizontal extent, the aspirator port chamber being located directly beneath and upwardly open to the upper chamber, the aspirator port chamber containing an upwardly facing particle collecting surface located substantially directly beneath the predetermined area in position such that the particles passing from the particulate outlets can fall thereon and collect and settle thereon, a generally horizontally facing aspirator port located beyond the horizontal extent of the predetermined area adjacent to and facing the particle collecting surface, and an element for connecting the aspirator port to an exhaust tract of the engine such that exhaust flow through the exhaust tract will create suction in the upper and aspirator port chambers toward the aspirator port;

wherein the aspirator port has a predetermined vertical extent, and the particle collecting surface has a predetermined horizontal extent in a direction directly facing or substantially aligned with the aspirator port sufficiently greater than the vertical extent of the aspirator port such that when the suction is too weak to aspirate the particles through the aspirator port and into the exhaust tract the particles can fall onto and collect and settle on the particle collecting surface so as to form an upwardly facing particle surface which is generally oriented at an angle of from about zero to about thirty degrees to horizontal in the direction aligned with the aspirator port, and such that later when the exhaust created suction is stronger the stronger suction can aspirate the collected particles through the aspirator port and into the exhaust tract.

7. The pre-cleaner of claim 6 wherein the horizontal extent of the particle collecting surface in the direction aligned with the aspirator port is equal to at least about one and one-half times the vertical extent of the aspirator port.

8. The pre-cleaner of claim 6 wherein the particle collecting surface has an upwardly open concave shape when viewed in the direction aligned with the aspirator port.

9. The pre-cleaner of claim 6 wherein the particle collecting surface is positioned and oriented such that the suction generated by the operation of the engine will draw a flow of air from the upper chamber along the particle surface such that the collected particles thereof will be lifted when aspirated into the aspirator port.

10. The pre-cleaner of claim 9 wherein the particulate collecting surface includes a curved surface portion spaced from and in opposing relation to the aspirator port, the curved surface portion curving downwardly in the direction aligned with the aspirator port, and a second surface portion extending generally horizontally in the direction aligned with the aspirator port from the curved surface portion to the aspirator port, the second surface portion having a horizontal extent in the direction aligned with the aspirator port which is equal to at least about twice the vertical extent of the aspirator port.

11. A pre-cleaner for an air induction system of an internal combustion engine, comprising:

a housing enclosing an upper chamber and an aspirator port chamber located beneath and upwardly open to the upper chamber, the housing including a generally horizontally facing aspirator port in the aspirator port chamber and an element for connecting the aspirator port to an exhaust tract of an engine such that exhaust flow through the exhaust tract alone can generate suction conditions in the aspirator port for aspirating contents of the aspirator port chamber through the aspirator port and into the exhaust tract, the aspirator port having a predetermined vertical extent;

the upper chamber containing a plurality of particulate separator tubes arranged in a predetermined array, each of the tubes including a particulate outlet through which particles removed from air flowing through the tubes en route to the engine are discharged into the upper chamber, substantially all of the particulate outlets being located directly over the aspirator port chamber such that the particles can flow or drop downwardly directly into the aspirator port chamber for aspiration through the aspirator port into the exhaust tract the suction conditions;

wherein an upwardly facing surface in the aspirator port chamber defines a trough located adjacent to the aspirator port having a horizontal extent in a direction substantially directly facing the aspirator port equal to at least about one and one-half times the vertical extent of the aspirator port.

* * * * *